(12) United States Patent
Kuo et al.

(10) Patent No.: US 7,123,573 B2
(45) Date of Patent: Oct. 17, 2006

(54) METHOD FOR REDUCING THE ROTATION SPEED OF AN AUTOMATIC BALL BALANCING SYSTEM OF AN OPTICAL DISK READING DEVICE

(75) Inventors: Lih-Hwa Kuo, Hsinchu (TW); Jeng-Jiun Chen, Taoyuan (TW); Bor-Ruey Chen, Kaohsiung (TW)

(73) Assignee: Lite-On IT Corp., (TW)

( * ) Notice: Subject to any disclaimer, the term of this patent is extended or adjusted under 35 U.S.C. 154(b) by 177 days.

(21) Appl. No.: 10/411,798

(22) Filed: Apr. 11, 2003

(65) Prior Publication Data

US 2004/0022170 A1  Feb. 5, 2004

(30) Foreign Application Priority Data

Jul. 30, 2002  (TW) .............................. 91117093 A

(51) Int. Cl.
*G11B 23/00* (2006.01)

(52) U.S. Cl. .................................................. 369/264

(58) Field of Classification Search ................ 369/264, 369/266, 270–271, 247, 251, 254, 263; 360/98.07–98.08, 360/99.04–99.05, 99.08, 99.12
See application file for complete search history.

(56) References Cited

U.S. PATENT DOCUMENTS

| | | | | |
|---|---|---|---|---|
| 6,005,749 A | * | 12/1999 | Ikuta et al. | 360/99.12 |
| 6,125,098 A | * | 9/2000 | Osawa | 369/266 |
| 6,212,973 B1 | * | 4/2001 | Sohn | 74/573 R |
| 6,249,505 B1 | * | 6/2001 | Miyamoto et al. | 369/266 |
| 6,510,122 B1 | * | 1/2003 | Yamauchi et al. | 369/266 |
| 6,535,475 B1 | * | 3/2003 | Sohn et al. | 369/264 |
| 6,731,588 B1 | * | 5/2004 | Han | 369/264 |

* cited by examiner

*Primary Examiner*—Angel Castro
(74) *Attorney, Agent, or Firm*—Raymond Sun

(57) ABSTRACT

An automatic ball balancing system for an optical disk reading device has a rotor mechanism that has a concave annular track formed on the rotor, with at least one ball placed on the annular track to perform automatic balancing. A surface with a low friction coefficient is also provided on the annular track in the gravity direction of the balls to reduce the movement resistance between the ball(s) and the annular track. In the meantime, the stable rotation speed of the rotor and the system phase angle of the ball(s) when the rotor reaches a stable rotation speed are also changed. One way of effecting this change is to bond or coat a material with a low friction coefficient on the annular track in the gravity direction of the balls. In this way, the balancing effect of the automatic ball balancing system can be improved.

12 Claims, 5 Drawing Sheets

METHOD FOR REDUCING THE ROTATION SPEED OF AN AUTOMATIC BALL BALANCING SYSTEM OF AN OPTICAL DISK READING DEVICE

BACKGROUND OF THE INVENTION

1. Field of the Invention

The present invention relates to an optical disk reading device, and in particular, to a method for improving the balanced position of the balls in an automatic ball balancing system. In particular, the present invention relates to a method which reduces the movement resistance on the surface of a track in the gravity direction of the balls to change the rotation speed of the rotor and the system phase angle of the balls when reaching the rotation speed, so as to improve the balancing effect of the automatic ball balancing system.

2. Description of the Prior Art

General optical disk reading devices, such as CD-ROM, DVD-ROM, CD-RW, DVD-RAM, and other optical data reproducing or recording devices, have been widely used in multimedia computer systems and have become an important component among the peripheral devices of computer systems.

The reading speed of an optical disk drive has increased significantly with the development of optical data storage medium technology. At present, most mainstream optical disk devices have a rotation speed of the spindle motor that is higher than 10000 RPM.

When a spindle motor rotates at high speeds, a centrifugal deviation force generated by unbalance of the disk is increased, leading to vibration, noise, and other problems. In the practical application of an optical disk drive, excessive vibration will cause instability in the reading ability of the optical head. As a result, the optical disk drive cannot effectively read data at the highest rotation speed. In addition, the noise generated when the optical disk drive rotates at high speed can bother and disturb the user of the optical disk drive. Consequently, how to effectively suppress vibration so that an optical disk drive can read data from the optical disk correctly and smoothly at the highest rotation speed is a problem that has yet to be effectively addressed.

Conventional optical disk drives are provided with an automatic ball balancing system in order to reduce the vibration of an optical disk drive during high-speed rotation caused by unbalance of the rotor of the rotation mechanism. The automatic ball balancing system is typically provided above or below the spindle motor. The automatic ball balancing system is effective in reducing vibration because it uses a method of adding a balancing mass to directly reduce the unbalance of the vibration.

The theory for the balls of the above-mentioned automatic ball balancing system to reach the desired balanced positions is based on the theory of rotor dynamics. FIGS. 1A–1C illustrate three possible conditions for the balls 2 in the automatic ball balancing system. First, when the stable rotation speed of the spindle motor is lower than the unstable critical rotation speed (called natural frequency of the suspending system), the unbalance amount of the balls 2 and the imbalance center of mass of the disk 3 of the system are in the same phase state (as shown in FIG. 1A). Second, when the stable rotation speed of the spindle motor is equal to the unstable critical rotation speed, there is a phase difference of 90° between the unbalance amount of the balls 2 and the imbalance center of mass of the disk 3 of the system (as shown in FIG. 1B). The numeral 4 in FIG. 1B illustrates the position of the balls 2 during this condition. Third, when the stable rotation speed of the spindle motor is higher than the unstable critical rotation speed, there is a phase difference of 180° between the unbalance amount of the balls 2 and the imbalance center of mass of the disk 3 of the system (as shown in FIG. 1C). Again, the numeral 4 in FIG. 1C illustrates the position of the balls 2 during this condition.

However, when the balancing balls 4 rotate and slide along the tracks within the rotor, the balancing balls 4 typically experience a movement resistance in the form of a frictional force opposite to the their motion. This movement resistance may be caused by the degree of roundness, concentric degree, and surface roughness of the balls 2. As a result, when the rotor (or spindle motor) reaches a stable rotation speed, the balls 2 cannot reach the system phase angle for the aforementioned stable rotation speed (that is lower than the unstable critical rotation speed). This opposite frictional force results in a phase angle delay of the balancing balls 4. The greater the frictional force, the greater the phase angle delay of the balancing balls 4. FIGS. 1A–1C describe the ideal result of the ball balancing system. As shown in FIG. 1C, when the stable rotational speed of the spindle motor is larger than the unstable critical rational speed, the phase angle difference is equal to 180 degrees, and vibration due to rotation will be suppressed significantly. On the other hand, if the phase angle difference is less than 180 degrees due to the frictional force, then the vibration cannot be suppressed significantly. Thus, if the phase angle difference between the balls 2 and the imbalance center of mass of the disk 3 is an integral times of 180 degrees, than the vibration will be reduced significantly. This will allow the rotational speed of rotor to be accelerated to greater speeds even when the rotational speed is larger than the unstable rotational speed.

FIG. 7 illustrates the phase angle delay between the balls 2 and the imbalance center of the disk 3.

SUMMARY OF THE DISCLOSURE

It is an objective of the present invention to provide a method for improving the balanced positions of the balls in an automatic ball balancing system. This method reduces the movement resistance of the balls and changes the stable rotation speed of the rotor, as well as the system phase angle of the balls, when the rotor reaches the stable rotation speed, so as to improve the balancing effect of the automatic ball balancing system.

It is another objective of the present invention to provide a material with low friction coefficient that is bonded to or coated on the track in the gravity direction of the balls to reduce the movement resistance between the balls and the track so that the balls can reach the corresponding phase angle when the rotation of the rotor becomes stable to achieve a better balancing effect.

In order to accomplish the objects of the present invention, the present invention provides a method for improving the balanced positions of the balls in an automatic ball balancing system in an optical disk reading device. In this method, the automatic ball balancing system has a rotor mechanism that has a concave annular track formed on the rotor, with at least one ball placed on the annular track to perform automatic balancing. A surface with a low friction coefficient is also provided on the annular track in the gravity direction of the balls to reduce the movement resistance between the ball(s) and the annular track. In the meantime, the stable rotation speed of the rotor and the system phase angle of the ball(s) when the rotor reaches a stable rotation speed are also changed. One way of effecting this change is to bond or coat a material with a low friction coefficient on the annular track in the gravity direction of the balls. In this way, the balancing effect of the automatic ball balancing system can be improved.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the principles of the present invention are described below in connection with an optical disk drive, the present invention can be applied to all optical disk reading devices, including but not limited to CD drives, DVD drives, CD/DVD drives, DVD/RW combo drives, car audio drives, etc.

Figure 1A:
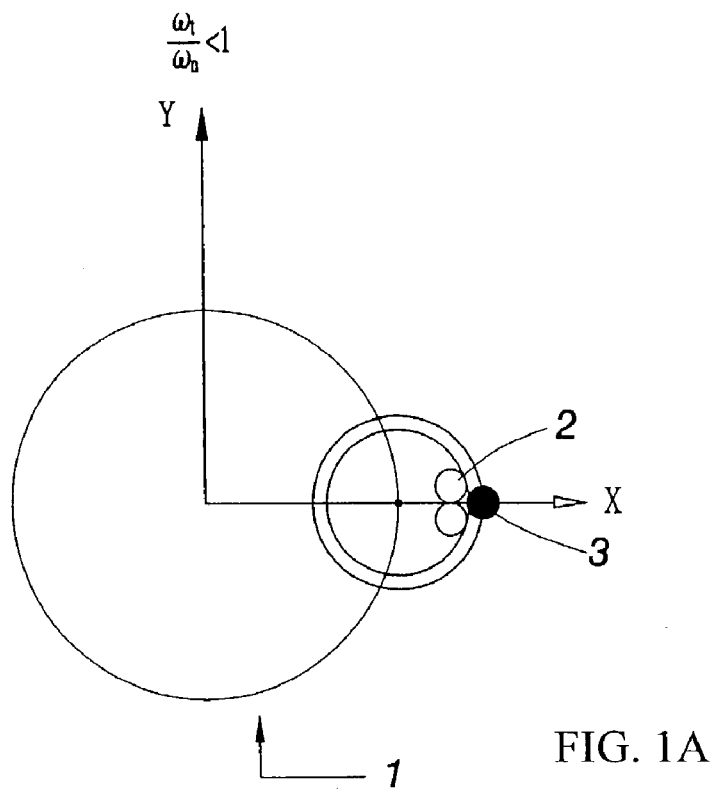
FIGS. 1A–1C illustrate the relationship between the unbalance amount of a conventional ball-balancing system and the center of mass of the disk as the rotation speed of the spindle motor varies with respect to the natural frequency.
Figure 1B:
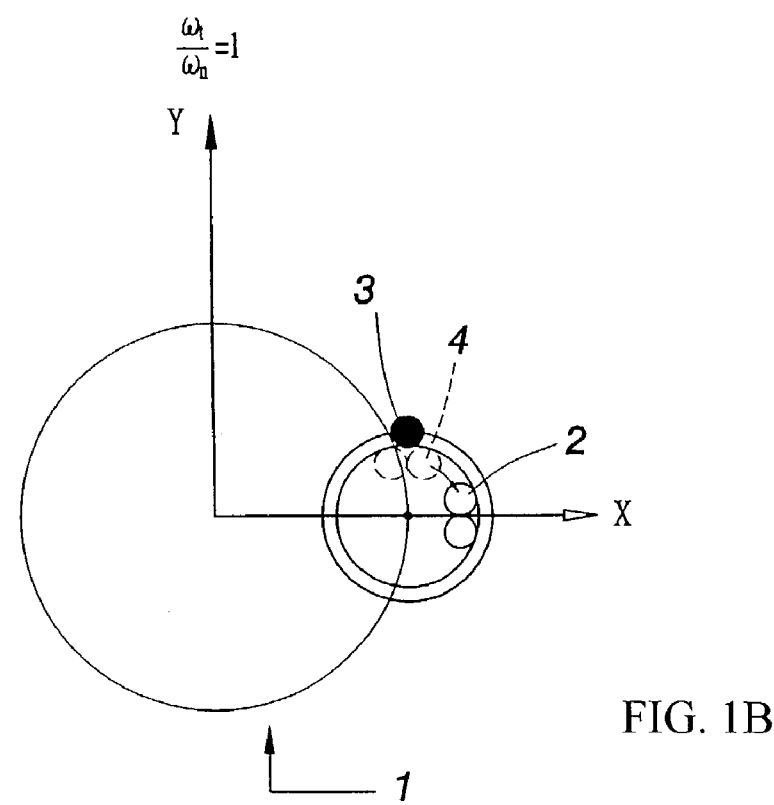
Figure 1C:
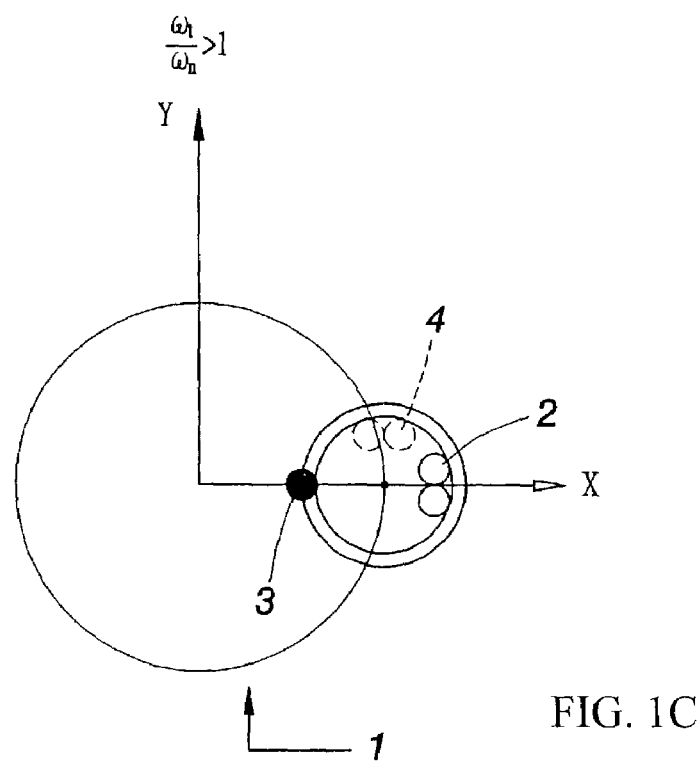
Figure 2:
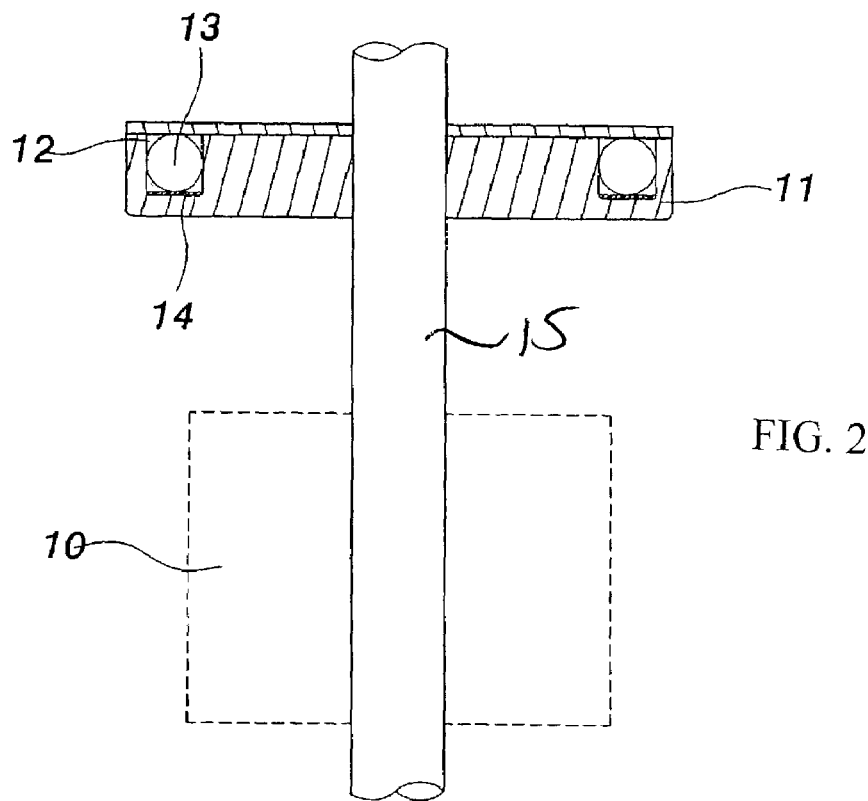
FIG. 2 illustrates one embodiment of the automatic ball balancing system according to the present invention.
Figure 7:
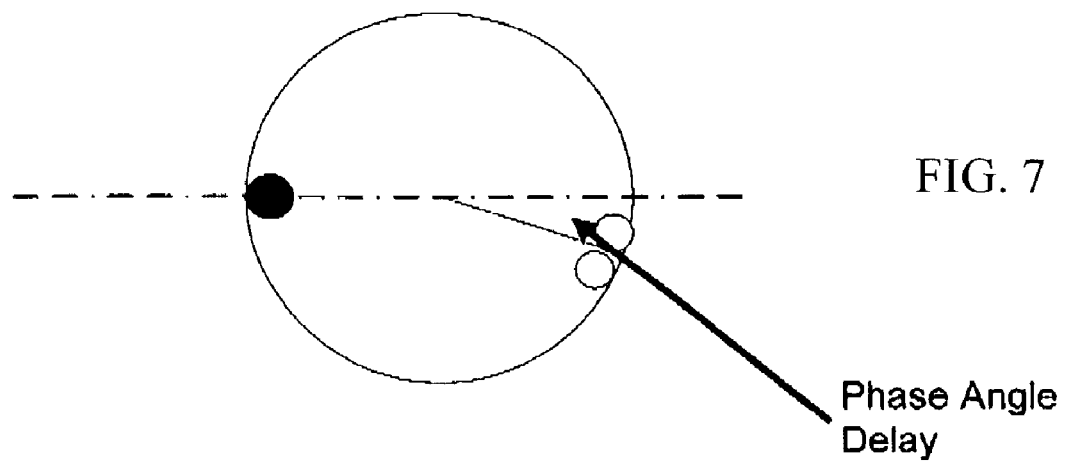
FIG. 7 illustrates the phase angle delay between the balls 2 and the imbalance center of the disk 3.

FIG. 2 illustrates an automatic ball balancing system according to the present invention, which is applied to the rotor mechanism installed in the optical disk drive to provide rotating movement. The rotor mechanism includes a spindle motor 10 and a rotor 11 driven by the spindle motor 10. The rotor 11 is connected to the rotation shaft 15 that is carried by the spindle motor 10. The automatic ball balancing system is shown as being installed above the spindle motor 10, although it is also possible to install the automatic ball balancing system below the spindle motor 10. The rotor 11 is shaped like a plate with at least one concave concentric annular track 12 facing upwardly. The track 12 is formed at the top of the rotor 11, and at least one ball 13 is placed on the track 12. The balls 13 can move freely along the track 12. When the optical disk drive is operated, the spindle motor 10 drives an optical disk (not shown in FIG. 2 but is above the rotor 11) to rotate via the rotor 11. During the rotation movement, the balls 13 on the track 12 are pressed against the outer side wall of the track 12 under centrifugal force. When the rotation speed of the rotor 11 is between the natural frequency and the unstable critical rotation speed, the system phase angle of the balls 13 will fluctuate in a stable interval, and the overall vibration of the system will decrease significantly. As a result, the balls 13 will move to the balanced positions.

In this automatic ball balancing system, assuming that the movement resistance of the balls 13 is proportional to the forward force, the following equation is obtained:

$$F = \mu_1 N \qquad \text{Equation (1)}$$

Figure 3:
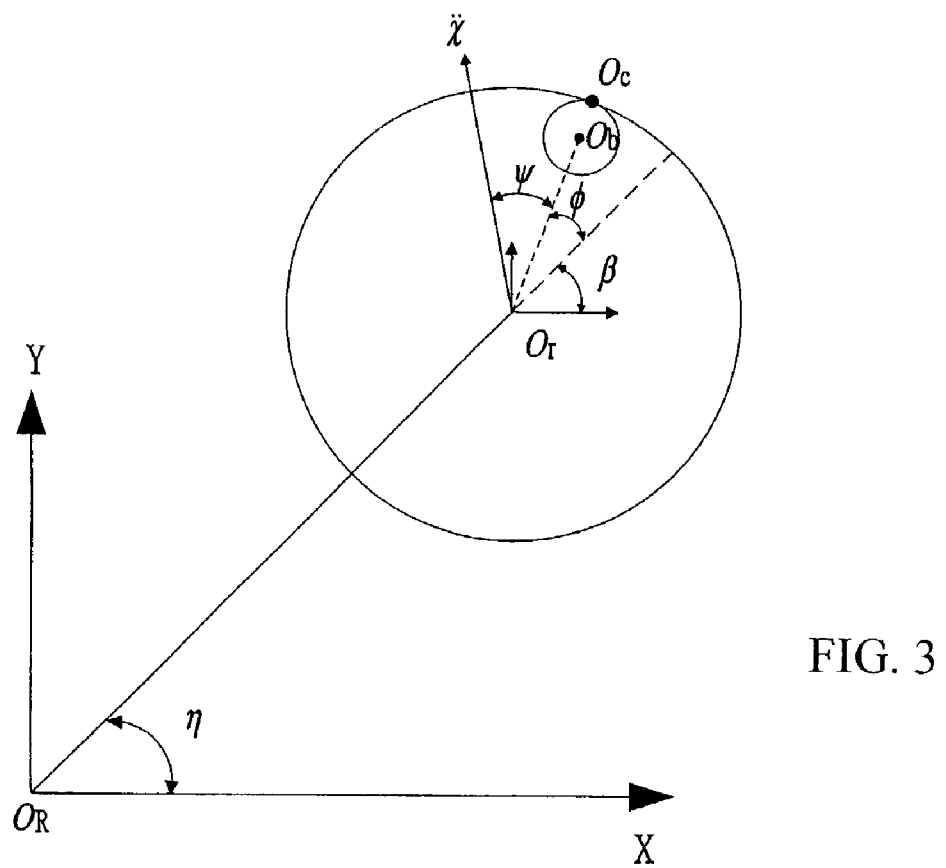
FIG. 3 shows the theoretical model of the automatic ball balancing system according to the present invention.

FIG. 3 shows the theoretical model of the automatic ball balancing system of FIG. 2. The equilibrium equation of the force of the balls 13 in the tangential direction is as follows.

$$m\left[\frac{d^2}{dt^2}\overline{O_R O_r} + (\vec{\beta} + \vec{\phi}) \times \vec{R}\right] = -\mu_1 m\left(\vec{\phi} \times \vec{\phi} \times \vec{R} + 2\vec{\beta} \times \vec{\phi} \times \vec{R} - \vec{\beta} \times \vec{\beta} \times \vec{r}\right)$$

also, if $\frac{d^2}{dt^2}\overline{O_R O_r} = \ddot{x}$ so $$\ddot{x}\sin\psi + (\vec{\beta}+\vec{\phi})R = \mu_1 r\dot{\beta}^2 - \mu_1 R\dot{\phi}^2 - 2\mu_1 R\dot{\beta}\dot{\phi}$$

because $$\vec{\beta} \cdot \vec{\phi} \leq 0$$

and $$|\dot{\beta}| > |\dot{\phi}|$$

Therefore, when the rotor 11 is accelerated to a certain speed (greater than natural frequency) and is held at a constant rotational speed, if the inequality in equation (2) below is satisfied, the ball 13 can move at a constant angular speed with respect to the track 12.

$$\ddot{x}\sin\psi > \mu_1 r\dot{\beta}^2 \qquad \text{Equation (2)}$$

Here, assume G(w) is the frequency response, and M is the mass of the system. If, by definition, β=w, equation (2) can be converted into the following:

$$G(w) > \frac{M\mu_1 r}{\sin\psi} \qquad \text{Equation (3)}$$

Figure 4:
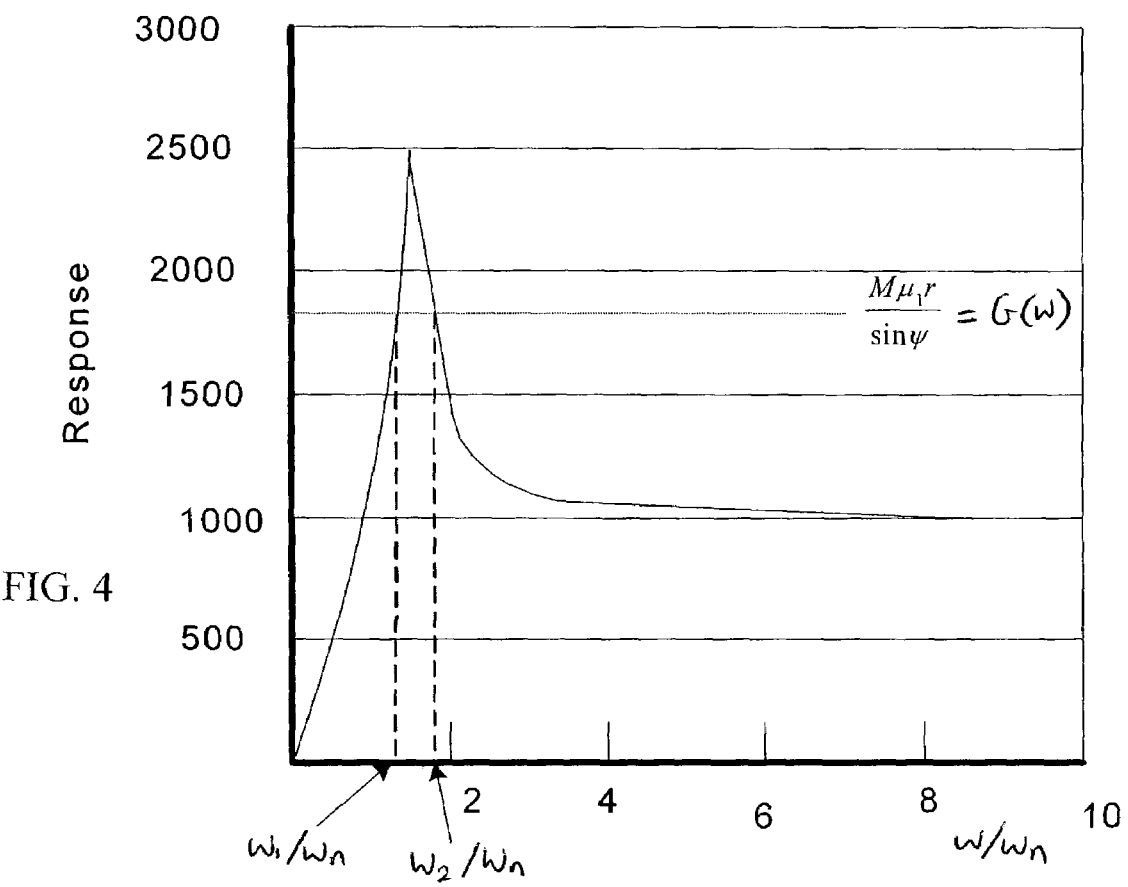
FIGS. 4 and 5 are frequency response diagrams of the present invention.

FIG. 4 illustrates the response versus the ratio of frequency. As shown in FIG. 4, the horizontal line y=G(w) intersects the curve at two points. The frequency of $w_1$ and $w_2$ can be obtained. $w_2$ can be defined as the unstable critical rotational speed and $w_n$ as the natural frequency of the system. If G(w) is sufficiently large, then it is possible to find $w_2$ as shown in FIG. 4. When the rotor 11 spins at a rotational speed that is larger than $w_2$, the vibration of rotor system will be significantly reduced.

Figure 5:
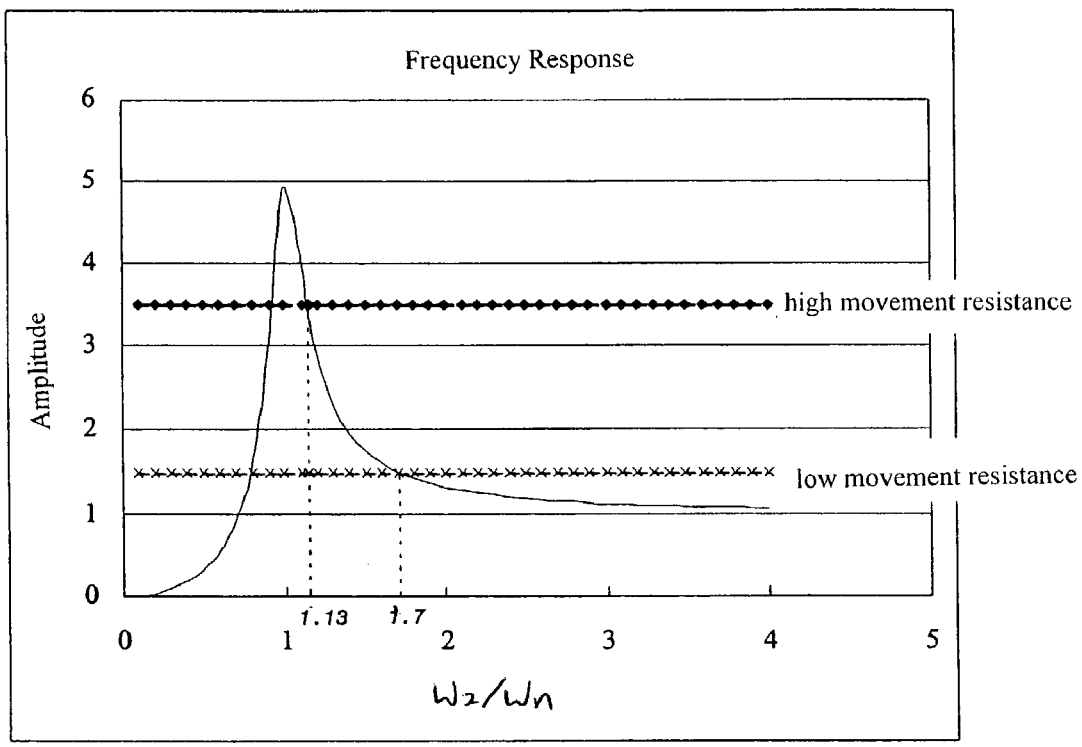

FIG. 5 shows an example of a frequency response diagram of the present invention. The rotational speed of the spindle motor is larger than the natural frequency $w_n$ of the system. Because the phase angle delay of the balancing balls 13 exists, the vibration will not be reduced efficiently. The greater the frictional force, the greater the vibration. In FIG. 5, if the movement resistance between the ball 13 and the track 12 is low, $w_2/w_n$ is 1.7. If the movement resistance between the ball 13 and the track 12 is high, $w_2/w_n$ is 1.13. Therefore, the lower the movement resistance between the ball 13 and the track 12, the greater the ratio of $w_2$ to $w_n$. In other words, if the moving friction between the ball 13 and the track 12 is reduced, the unstable critical speed $w_2$ of the rotor 11 will rise, while the vibration will be reduced. Thus, the rotor 11 can reach a relatively high rotational speed, so that a relatively low vibration is generated. If the rotational speed of the rotor 11 is increased continuously to exceed the unstable critical speed $w_2$ of the ball 13, the vibration of the ball 13 and the entire rotor system will be gradually reduced. This will also allow the rotor 11 to reach a higher stable rotational speed.

Figure 6:
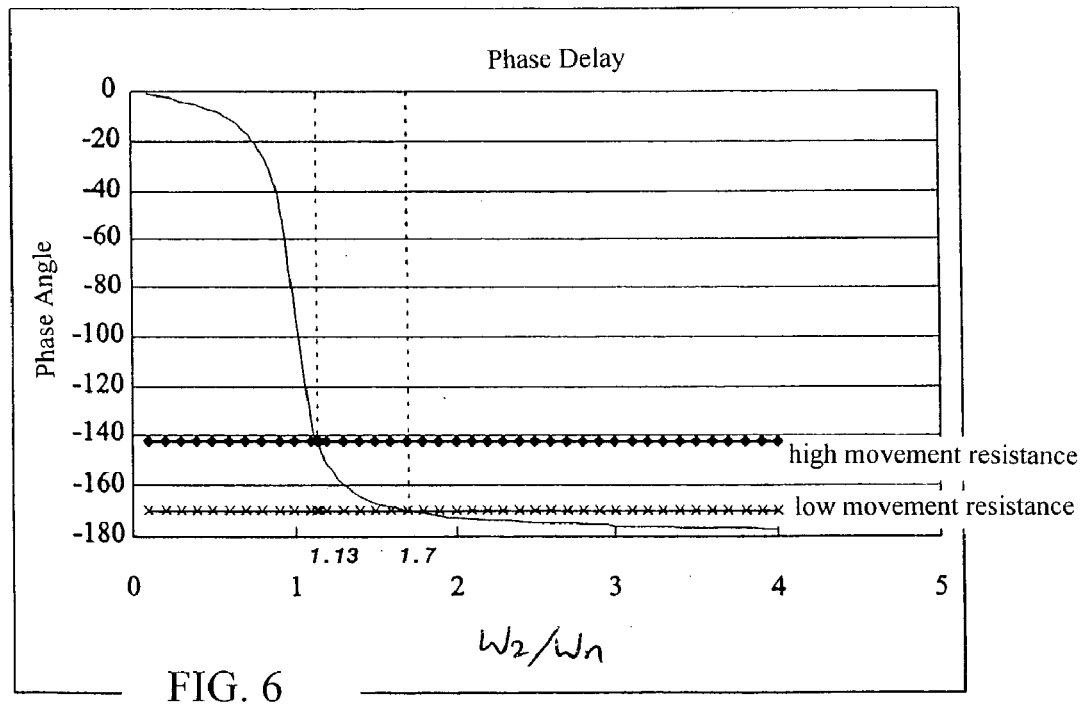
FIG. 6 is a phase delay diagram of the present invention.

FIG. 6 illustrates the phase angle delay versus the ratio of frequency. When the balancing balls 13 encounter greater frictional force, the phase angle difference between the balancing balls 13 and the imbalance of disk increases accordingly. Thus, the vibration will not be reduced efficiently. FIG. 6 also shows that the lower the movement resistance between the ball 13 and the track 12, the greater the ratio $w_2/w_n$. With the rotor 11 at this rotation speed $w_2$, the phase angle to be compensated for the balls 13 to reach the balanced state becomes smaller. Otherwise, the phase angle needed becomes larger. If there is sliding friction in the gravity direction, equation (3) should be modified as follows:

$$G(w) > \frac{M\mu_1 r + \mu_2(g+a)}{\sin\psi} \quad \text{Equation (4)}$$

As a result, it can be seen from the frequency response diagram (FIG. 5) and the phase delay diagram (FIG. 6) that the unstable critical rotation speed $w_2$ of the balls 13 is changed due to the frictional force in the gravity direction of the balls 13, and the system phase angle as well as the balanced positions of the balls 13 are also changed.

Consequently, a surface 14 with a low friction coefficient is provided on the track 12 in the gravity direction of the balls 13 to solve the problem of reducing the friction in the gravity direction of the balls 13. A material with a low friction coefficient can be bonded or coated on the track 12 to provide a surface with a low friction coefficient on the bottom of track 12. Non-limiting examples of such a material include, but are not limited to, Teflon. In this way, it is possible to reduce the movement resistance between the balls 13 and the track 12. As a result, the balancing effect of the automatic ball balancing system can be improved.

In summary, the balancing effect of the automatic ball balancing system can be improved by: (i) changing the friction coefficient of the contact surface of the balls 13 in the gravity direction, and (ii) changing the stable rotation speed of the rotor 11 as well as the phase angles of the balls 13 when the rotor 11 reaches this stable rotation speed. In this regard, according to the theory of rotor dynamics, the phase angle difference between the imbalance of the disk 3 and the balls 13 should be 180 degrees. However, due to the friction between balls 13 and the track 12, the balls 13 cannot reach the position where the phase angle difference is 180 degrees, so that the phase angle delay appears. If the friction between the balls 13 and the track 12 is improved, then the stable rotation speed with smaller friction will be lower than the speed with larger friction. Point (i) describes how the method according to the present invention can resolve the phase angle delay and the vibration. Point (ii) above indicates an improved situation after the material with lower friction is applied to the track 12.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An automatic ball balancing system for use in an optical disk reading device, comprising:
   a rotor having a concave annular track having a base with a low friction coefficient surface provided only on the base of the annular track; and
   at least one ball provided in the annular track and which travels along the low friction coefficient surface on the annular track.

2. The ball balancing system of claim 1, wherein the rotor has an upper surface, and the annular track opens to the upper surface.

3. The ball balancing system of claim 1, wherein the annular track is generally U-shaped.

4. The ball balancing system of claim 1, wherein the low friction coefficient surface is made from Teflon.

5. The ball balancing system of claim 1, wherein the low friction coefficient surface is coated on a bottom surface of the annular track.

6. An automatic ball balancing system for use in an optical disk reading device comprising:
   a rotor having a concave annular track with a low friction coefficient surface provided on the annular track; and
   at least one ball provided in the annular track and which travels along the low friction coefficient surface on the annular track;
   wherein the low friction coefficient surface is bonded to a bottom surface of the annular track.

7. An optical disk reading device, comprising:
   a spindle motor;
   a rotor operatively coupled to the spindle motor and having a concave annular track that has a base, with a low friction coefficient surface provided only on the base of the annular track; and
   at least one ball provided in the annular track and which travels along the low friction coefficient surface on the annular track.

8. The device of claim 7, wherein the rotor has an upper surface, and the annular track opens to the upper surface.

9. The device of claim 7, wherein the annular track is generally U-shaped.

10. The device of claim 7, wherein the low friction coefficient surface is made from Teflon.

11. The device of claim 7, wherein the low friction coefficient surface is coated on a bottom surface of the annular track.

12. An optical disk reading devices comprising:
    a spindle motor;
    a rotor operatively coupled to the spindle motor and having a concave annular track with a low friction coefficient surface provided on the annular track; and
    at least one ball provided in the annular track and which travels along the low friction coefficient surface on the annular track;
    wherein the low friction coefficient surface is bonded to a bottom surface of the annular track.

* * * * *